(12) United States Patent
Xiao et al.

(10) Patent No.: US 8,250,141 B2
(45) Date of Patent: Aug. 21, 2012

(54) REAL-TIME EVENT NOTIFICATION FOR COLLABORATIVE COMPUTING SESSIONS

(75) Inventors: Sihai Xiao, Fremont, CA (US); Zheng Yuan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 330 days.

(21) Appl. No.: 12/168,181

(22) Filed: Jul. 7, 2008

(65) Prior Publication Data
US 2010/0005142 A1 Jan. 7, 2010

(51) Int. Cl.
*G06F 15/16* (2006.01)
(52) U.S. Cl. ........................................ 709/204
(58) Field of Classification Search .......... 709/204–207, 709/227–229
See application file for complete search history.

(56) References Cited

U.S. PATENT DOCUMENTS

| | | | |
|---|---|---|---|
| 4,965,772 A | 10/1990 | Daniel et al. | |
| 6,182,249 B1 | 1/2001 | Wookey et al. | |
| 6,343,313 B1 | 1/2002 | Salesky et al. | |
| 6,484,200 B1 | 11/2002 | Angal et al. | |
| 7,069,309 B1 * | 6/2006 | Dodrill et al. | 709/219 |
| 7,092,497 B1 | 8/2006 | Spielman et al. | |
| 7,249,359 B1 | 7/2007 | McCloghrie et al. | |
| 7,281,040 B1 | 10/2007 | Ly | |
| 7,370,102 B1 | 5/2008 | Chu et al. | |
| 7,401,098 B2 * | 7/2008 | Baker | 1/1 |
| 7,739,340 B2 * | 6/2010 | Arenburg et al. | 709/206 |
| 2003/0035381 A1 * | 2/2003 | Chen et al. | 370/261 |
| 2003/0158900 A1 * | 8/2003 | Santos | 709/205 |
| 2003/0167301 A1 | 9/2003 | Zhu et al. | |
| 2004/0034723 A1 * | 2/2004 | Giroti | 710/8 |
| 2004/0141605 A1 * | 7/2004 | Chen et al. | 379/202.01 |
| 2004/0199580 A1 * | 10/2004 | Zhakov et al. | 709/204 |
| 2006/0095376 A1 * | 5/2006 | Mitchell et al. | 705/50 |
| 2006/0149815 A1 * | 7/2006 | Spradling et al. | 709/205 |
| 2006/0182249 A1 * | 8/2006 | Archambault et al. | 379/202.01 |
| 2006/0239212 A1 * | 10/2006 | Pirzada et al. | 370/260 |
| 2006/0248183 A1 * | 11/2006 | Barton | 709/224 |
| 2007/0011498 A1 | 1/2007 | Shaffer et al. | |
| 2007/0081651 A1 * | 4/2007 | Iyer et al. | 379/202.01 |
| 2007/0094661 A1 | 4/2007 | Baird et al. | |
| 2007/0100986 A1 * | 5/2007 | Bagley et al. | 709/224 |
| 2007/0116226 A1 * | 5/2007 | Bennett et al. | 379/202.01 |
| 2007/0150583 A1 | 6/2007 | Asthana et al. | |
| 2007/0153712 A1 | 7/2007 | Fry et al. | |
| 2007/0156811 A1 | 7/2007 | Jain et al. | |
| 2008/0037751 A1 * | 2/2008 | Aldrey et al. | 379/202.01 |
| 2008/0151785 A1 * | 6/2008 | Sylvain | 370/260 |
| 2009/0323916 A1 * | 12/2009 | O'Sullivan et al. | 379/202.01 |
| 2010/0185958 A1 * | 7/2010 | Shen | 715/753 |

FOREIGN PATENT DOCUMENTS

WO WO 0152161 A2 * 7/2001

* cited by examiner

*Primary Examiner* — Brendan Higa

(57) ABSTRACT

In one embodiment, a determination is made that a specified event of a collaborative computing session has occurred. In response to the specified event, a real-time electronic notification is transmitted to a particular set of one or more attendees of the session that the event has occurred, the notification illustratively transmitted via a communication channel other than the session.

23 Claims, 9 Drawing Sheets

EVENT / NOTIFICATION MAPPING TABLE 700

| EVENT 705 | SET OF PARTICIPANTS 710 | COMMUNICATION CHANNEL 715 | NOTIFICATION 720 (800) |
|---|---|---|---|
| HOST JOINS | "A" | EMAIL A's EMAIL | (EMAIL) |
| HOST JOINS | "B" | EMAIL B's EMAIL | (EMAIL) |
| HOST JOINS | "C" | CALL C's PHONE | (VOICE) |
| HOST JOINS | "D" | TEXT D's PHONE | (TEXT) |
| PARTICIPANT D JOINS | "E" | EMAIL E's EMAIL | (EMAIL) |
| ... | ... | ... | ... |

{ 150 covering HOST JOINS and PARTICIPANT D JOINS rows }

FIG. 7

REAL-TIME EVENT NOTIFICATION FOR COLLABORATIVE COMPUTING SESSIONS

TECHNICAL FIELD

The present disclosure relates generally to computer networks, and, more particularly, to collaborative computing sessions.

BACKGROUND

Collaborative computing sessions, such as interactive conferences (e.g., "web" or "online" conferences/meetings), may be supported by a network of servers and client computers. In particular, one or more participants, e.g., hosts and/or attendees, may join a session from their client computers through an access point to the servers, such as a web page. For example, the access point may request certain information, such as a meeting identifier, username, password, etc., in order to allow each participant to join the session.

In the event the host has yet to join the session, thus the associated meeting has yet to start, other participants/attendees may either be prevented from joining the session, or will join the session and wait for the host to join. If unable to join, an attendee will be forced to continually return to the access point to refresh/update the status of the host and meeting, otherwise risking missing the meeting's start. Likewise, if an attendee has joined the session before the host, the attendee may still be forced to wait for the host to join and begin the meeting. In many situations, the attendee may desire to do something else after he/she learns that the meeting has not yet started, but typically will not want to miss the meeting when the meeting finally starts.

BRIEF DESCRIPTION OF THE DRAWINGS

The embodiments described herein may be better understood by referring to the following description in conjunction with the accompanying drawings in which like reference numerals indicate identically or functionally similar elements, of which:

FIG. 7 illustrates an example event/notification table.

DESCRIPTION OF EXAMPLE EMBODIMENTS

Overview

According to embodiments of the disclosure, a determination is made that a specified event of a collaborative computing session has occurred (e.g., a host of a web browser-based session joins the session, etc.). In response to the specified event, a real-time electronic notification is transmitted to a particular set of one or more attendees of the session that the event has occurred, the notification illustratively transmitted via a communication channel other than the session (e.g., email, phone, etc.).

Description

Architecture for Collaborative Computing Sessions

Figure 1:
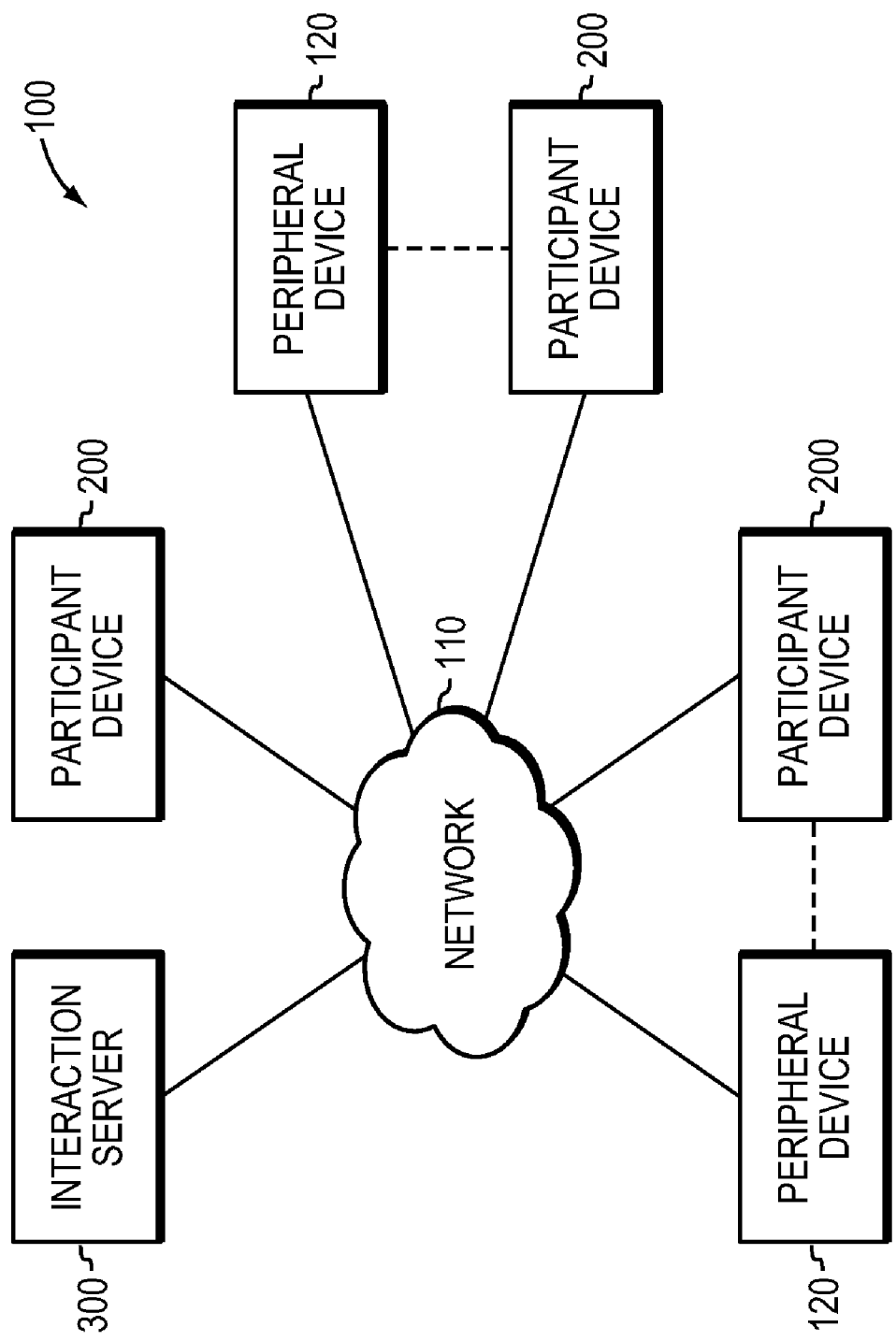
FIG. 1 illustrates an example computer network.

FIG. 1 is a schematic block diagram of an example computer network 100 illustratively comprising nodes/devices, such as one or more participant devices 200 and one or more interaction servers 300 interconnected by links/network 110 as shown and as described further herein. Also, one or more peripheral devices 120, such as phones, pagers, etc., may also be interconnected with the network 110, and illustratively associated with a particular participant whose device 200 is interconnected with the network 110. Those skilled in the art will understand that any number of nodes, devices, links, etc. may be used in the computer network, and that the view shown herein is for simplicity. (Also, as used herein, the term "node" may be used to generally describe a node, device, computer, etc., as may be appreciated by those skilled in the art.)

In this environment, a number of participants may interact in an on-line, interactive, or collaborative setting. Such a setting can be for a meeting, training or education, support, or any other event that may require a number of participants to work together, interact, collaborate, or otherwise participate, such as web conferences, on-line meetings, etc. As used herein, the phrase "collaborative computing session" may be used to describe these settings/events, particularly where a number of participant computers/devices collaborate in an established session, as may be appreciated by those skilled in the art. Also, as used herein, a "session" describes a generally lasting communication between one or more participant devices 200 through the interaction server 300. Those skilled in the art will understand that the session may be implemented/established using protocols and services provided by various layers (e.g., application, session, and/or transport layers) of a network protocol stack according to the well-known OSI model. Conversely, a "meeting" describes a personal layer of communication overlaid upon the session where participants/users communicate with each other. Moreover, while the terms "session" and "meeting" may generally be used interchangeably herein to denote a collaboration of people or devices, particular instances of their use may denote a particular distinction (e.g., a session may start with attendees joining/connecting to the servers, while a meeting may not start until a host/presenter joins the session), as may be understood by those skilled in the art.

Notably, a collaborative computing session as used herein is distinguished from groups of computers "collaborating" for computational (e.g., processing or memory) or computerized measuring and/or monitoring purposes, such as those for use with tracking stock markets, measuring parameters (e.g., field instruments), network devices (e.g., routers, switches, storage devices, etc.), or other types of devices and associated "sessions." That is, a collaborative computing session as used herein defines a session among participant devices 200 and an interaction server 300 for use with sharing/distributing video and/or audio for presentations, meetings, or other personally collaborative events.

In particular, each participant (e.g., hosts/presenters and/or attendees) may operate a participant device 200. Each participant device 200 may comprise an electronic device with capability for visual and/or auditory presentation. Thus, a participant device 200 can be, for example, a desktop personal computer (PC), a laptop computer, a workstation, a personal digital assistant (PDA), a wireless telephone, a smart phone, an Internet television, and the like. Each participant device 200 supports communication by a respective participant, in the form of suitable input device (e.g., keyboard, mouse, stylus, keypad, etc.) and output device (e.g., monitor, display, speech, voice, or other device supporting the presentation of audible/visual information). Each participant device may be interconnected with a suitable communications network 110 such as, for example, the Internet, and may appear as a client computer thereon.

In one embodiment, each participant device 200 may operate under the control of a suitable operating system (OS) (e.g., WINDOWS, UNIX, etc.) to run software applications (e.g., in the form of code modules) which may be installed, received, or downloaded. At least some of these software applications may support specific functions, such as, for example, functions related to the on-line, interactive meeting (a collaborative computing session), such as conventional web browser programs that allow convenient access and navigation of the Internet (e.g., the World Wide Web).

The on-line meeting (collaborative computing session) of the various participants may be supported by an interaction server 300 which may be maintained or operated by one or more of the participants and/or a third-party service provider. The interaction server 300 may be a computer system that is connected to network 110, and which may comprise and appear as one or more server computers thereon. Interaction server 300 may store information (e.g., content) and application modules which can be provided to the participant devices 200. In some embodiments, these application modules are downloadable to the participant devices 200 and may support various functions that may be required for an interactive meeting or collaborative effort among the participants. The participant devices 200 and the interaction server 300 may interact in a client/server architecture, which may provide high performance and security for a multi-participant collaborative environment.

Network 110 may comprise or be supported by one or more suitable communication networks, such as, for example, a telecommunications network that allows communication via one or more telecommunications lines/channels. In particular, the communication or data networks, such as the Internet, may be used to deliver content, such as for the collaborative computing sessions herein. The Internet is an interconnection of computer clients and servers located throughout the world and exchanging information according to Transmission Control Protocol/Internet Protocol (TCP/IP), Internetwork Packet eXchange/Sequence Packet eXchange (IPX/SPX), AppleTalk, or other suitable protocol. The Internet supports the distributed application known as the "World Wide Web." Web servers maintain websites, each comprising one or more web pages at which information is made available for viewing and audio/hearing. Each website or web page may be supported by documents formatted in any suitable conventional markup language (e.g., HTML or XML). Information may be communicated from a web server to a client using a suitable protocol, such as, for example, Hypertext Transfer Protocol (HTTP) or File Transfer Protocol (FTP).

Figure 2:
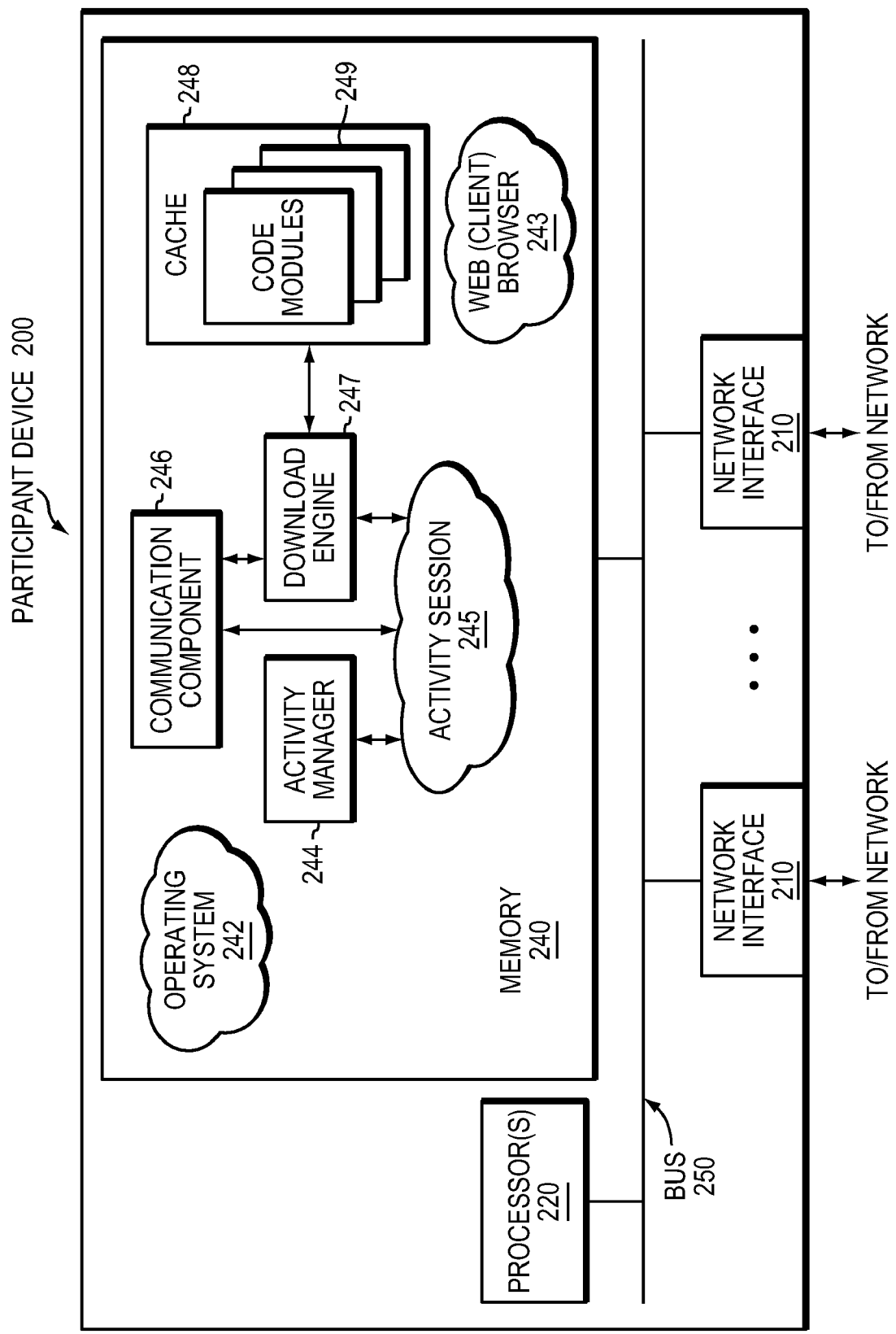
FIG. 2 illustrates an example participant device.

FIG. 2 illustrates a schematic block diagram of an example participant device 200 that may be advantageously used with one or more embodiments described herein, e.g., for collaborative computing. Illustratively, device 200 may be implemented or incorporated in any suitable computer such as, for example, a personal computer (PC), laptop, workstation, personal digital assistant (PDA), smart phone, mainframe, file server, workstation, or other suitable data processing facility supported by storage (either internal, e.g., electronic memory, or external, e.g., magnetic/optical disk), and operating under the control of any suitable OS.

In particular, the device 200 comprises a plurality of network interfaces 210, one or more processors 220, and a memory 240 interconnected by a system bus 250. The network interfaces 210 contain the mechanical, electrical, and signaling circuitry for communicating data over physical/wireless links coupled to the network 110. The network interfaces may be configured to transmit and/or receive data using a variety of different communication protocols suitable for the network. For example, the network interfaces, as described herein, may be adapted to communicate traffic (data/packets) over "in-band" communication channels of a collaborative computing session and also traffic over one or more "out-of-band" communication channels other than the "in-band" channels associated with the collaborative computing session.

The memory 240 comprises a plurality of storage locations that are addressable by the processor(s) 220 and the network interfaces 210 for storing software programs associated with the embodiments described herein. A portion of the memory may be arranged as a cache 248 configured to store one or more code modules 249 and/or data structures associated with the embodiments described herein. The processor(s) 220 may comprise necessary elements or logic adapted to execute the software programs and manipulate the data structures. An operating system 242, portions of which are typically resident in memory 240 and executed by the processor(s), functionally organizes the device by, inter alia, invoking operations in support of software processes and/or services executing on the device (e.g., for collaborative computing sessions as used herein). In particular, these software processes and/or services may comprise an activity manager 244, a communications component 246, a download engine 247, and an activity session 245. It will be apparent to those skilled in the art that other types of processors and memory, including various computer-readable media, may be used to store and execute program instructions pertaining to the inventive technique described herein, such as a web browser 243, known in the art. Also, activity manager 244, communications component 246, code modules 249, download engine 247, and/or activity session 245 may be operated as instances of suitable programs running on the hardware of a participant device 200, as will be further appreciated by those skilled in the art.

Activity manager 244 may contain computer executable instructions executed by each processor 220 to generally perform functions to manage or control various processes or aspects during the course of an activity (e.g., on-line meeting or collaborative computing session) in which the participant (user) may interact with other users. As shown in FIG. 2, this activity may be run in activity session 245. In the context of on-line meetings, for example, the activity manager 244 may manage meeting-related actions (e.g., starting a session, ending a session, locking a session, etc.), manage participant-related actions (e.g., designating a participant as a session host, assigning a participant the presenter privileges, expelling a participant, establishing participant privileges, etc.), manage session-related actions (e.g., starting a sharing session, closing a sharing session, setting privileges within that sharing session, etc.), and support an interface with the user or participant, and provide a container for embedding one or more application code modules.

A communications component 246 supports communication between system 200 and an outside network 110 (e.g., the Internet), such as through network interfaces 210. Communications component 246 thus allows data and information to be exchanged with or retrieved from other systems or facilities (e.g., participant devices 200 or interaction server 300), for example, during an online meeting or other collaborative computing session. In particular, the communications component 246 may provide a communication platform for any one or more of the activity manager 244, the activity session 245, the download engine 247, and the application code modules 249. The activity manager 244 may rely on the communications component 246 to establish and maintain the client connection to the interaction server 300 on which the activity session is hosted. Each application code module 249 may also use the established client connection to provide real-time data that is sent and received by each participant.

Various functionality for supporting a collaborative computing session, such as an on-line meeting, may be provided by the one or more application code modules 249. These application code modules 249 may be stored/maintained by cache 248, and may support, for example, basic communication framework, file sharing (e.g., for text, images, video, audio), user authentication, meeting scheduling, address book, files and folders, invoices, billing, scheduling, telephone or video conferencing, authentication, database management, word processing, application sharing, accounting, etc. For example, code modules may comprise (not specifically shown) a text-based chat module, a polling module, a video module, a voice over Internet Protocol (VOIP) module, a question-answer (QA) module, a file transfer module, a presentation module, an application/desktop view/share module, and an Internet telephony module. Also, one or more of the application code modules 249 may be dynamic linked library (DLL or ".dll") executable object code files.

Illustratively, the video and/or VOIP modules may provide real-time video and/or voice/audio functionality to each participant to provide different functionality to each participant depending on the status and privileges of that participant. For example, for a participant who is a presenter, the modules may capture the video image from a video input device and/or audio from an audio input device, encode the data, and unicast the data to the other participants through the interaction server 300. For each participant that receives the data, the respective modules may decode the data and display/play the content. Thus, the video module may allow or enable various participants to join or exit a video session, edit video segments, or change a video presenter, while the VOIP module may allow or enable various participants to join or exit a VOIP session, pass the microphone to another participant, or display a volume window or control.

Also, the text-based chat module may provide a real-time text messaging function to each participant, allowing or enabling participants to join or exit an online chat, save or print a portion of the chat messaging, load a chat file, or change the privileges of participants involved in the chat. Also, the polling module and/or QA module may provide real-time polling (or question and answer) functionality to each participant.

Further, the file transfer module may provide functionality for transferring files between and among participants in the session. The functions of the file transfer module vary depending on the status and privileges of each participant. For example, the file transfer module may allow a host/presenter to open any directory accessible from the participant device 200 (local machine) and to post a file pointer in a transfer container. Additionally, a presenter can set file transfer privileges for each participant. Any other participant who has been given privileges to download the file can select the file pointer from the list and save the file to his/her local machine. The file transfer module may allow or enable participants to join or exit a transfer, set permissions for the transfer, transfer the file, and save a file.

Moreover, the presentation module may provide functionality that allows participants to share various printable media types (e.g., document, whiteboard, or facsimile). For the participant who is a presenter, the presentation module can convert the selected media content, encode the data, and unicast the data to the other participants via the inter-action server 300 (e.g., in a proprietary format). For the each participant that receives the data, the presentation module may decode the data and display the content. The presentation module may allow or enable participants to open, join, or exit a session of a presentation, save, print, or copy a portion of the presentation, change a presenter, get information about the presentation, add or clear annotations from the presentation, choose a font for the text of presentation, and send the presentation to others via facsimile transmission.

The application viewing/sharing module may provide functionality that allows participants to share single applications, multiple applications, or the entire desktop (as understood by those skilled in the art). For the participant who is a presenter, the application viewing/sharing module may display a list of currently running processes that are located at the user level of the local machine. The application viewing/sharing module may prompt the user to select another participant in which to share the content. In one embodiment, through a complex kernel driver or screen capturing technology, the application viewing/sharing module will capture the GDI calls made from the applications to the system, convert and encode the data, and unicast the data to the other participants via the interaction server 300. For each participant that receives the data, the application viewing/sharing module may decode the data and display the content. The application viewing/sharing module may allow or enable participants to join or exit a session of application sharing, share or not share an application, set sharing privileges, enter or leave annotations, provide a full screen view of shared information, and get information to be shared.

Still further, the telephony module may provide a simple user interface for participating in an interactive, on-line telephony session. The telephony module may allow or enable participants to join or exit a telephony session, place or disconnect from a telephony call, invite someone else to join in a telephony call, mute or un-mute a telephony call, and get information for a telephone number.

Those skilled in the art may appreciate that the code modules and their respective functionalities are merely examples, and a participant device 200 may comprise additional or fewer code modules 249 than those described above. As such, code modules may be added or removed per-functionality in order to support a collaborative computing session, whether those functions are needed or optional, and the specific code modules described herein are not meant to limit the scope of the embodiments described herein.

Notably, download engine component 247 may be in communication with activity session component 245, communications component 246, and cache 248 to cause various application modules 249 to be downloaded (e.g., automatically) to system 200 (cache 248) under certain circumstances, such as during an initialization process or when the functionality that is supported by such modules is required. Illustratively, the download engine component 247 may be implemented as ActiveX code (ActiveX download engine), Java code (Java download engine), or any other suitable code which may be appropriate for various browser software. (That is, depending on the browser software that the participant is using to access the meeting and depending on browser and system permissions, the appropriate code-version of the download engine component may be invoked.)

Figure 3:
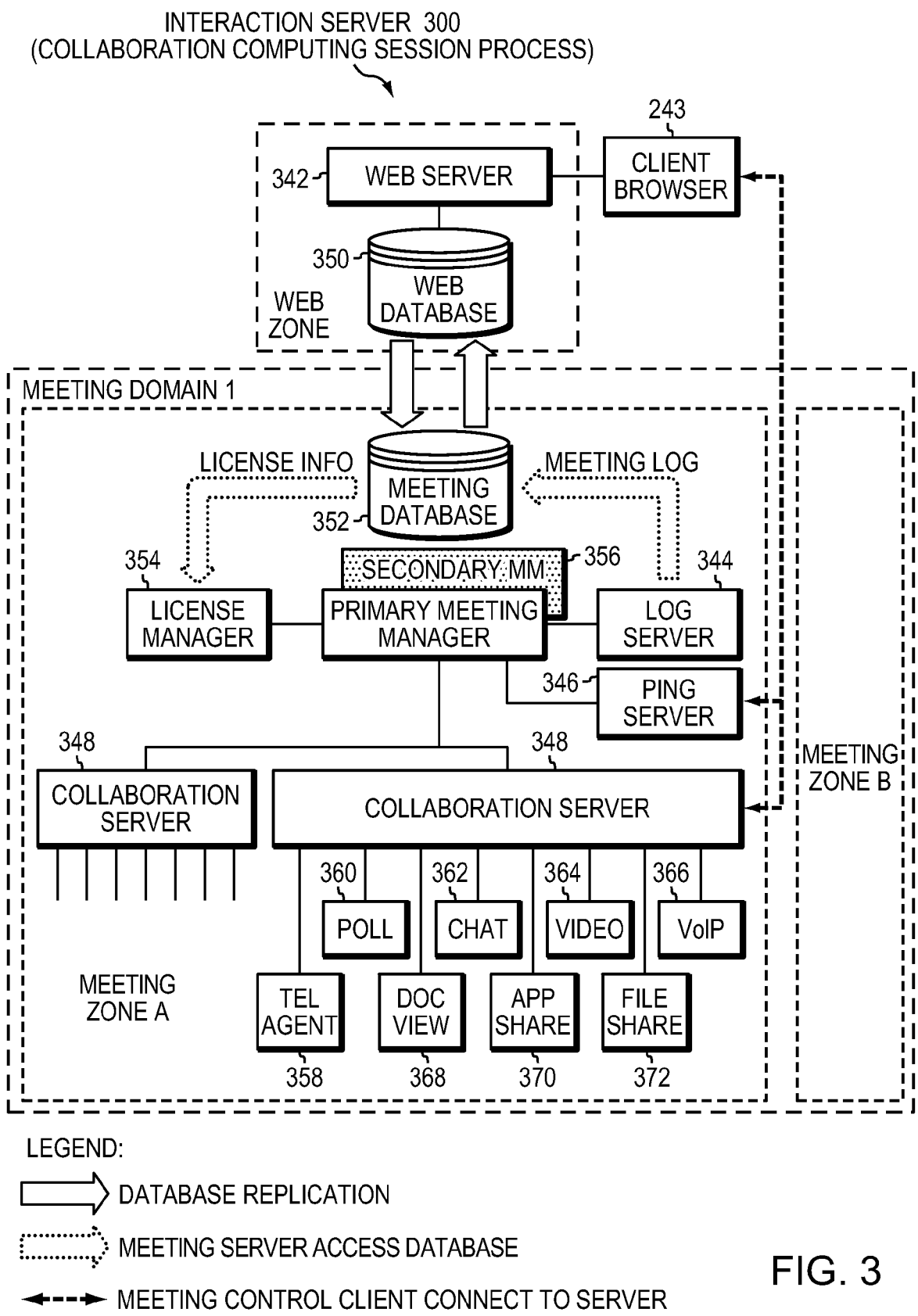
FIG. 3 illustrates an example interaction server.

FIG. 3 illustrates an example implementation for a computer system that may operate as interaction server 300 according to one or more embodiments described herein.

Illustratively, in the computer system environment as shown, a number of server computers and databases may be in communication to provide for collaborative meeting or computing. As such, the interaction server 300 and its various components may be referred to as a collaborative computing process 300. (Illustrative details for such a computer system environment may be found in commonly-owned, copending U.S. patent application Ser. Ser. No. 09/751,424 entitled "DISTRIBUTED NETWORK SYSTEM ARCHITECTURE FOR COLLABORATIVE COMPUTING," filed on Dec. 29, 2000, by Zhu et al., now published as U.S. Patent Application Publication 2003/0167301 on Sep. 4, 2003.) Notably, while the illustrative embodiment described below shows a collection of servers (e.g., localized and/or distributed), a single server may also operate to perform the functions described herein (e.g., collaborative computing process 300). Thus, "interaction server 300" may comprise, either as a single server or as a collection of servers, one or more memories, one or more processors, one or more network interfaces (e.g., adapted to communicate traffic for a collaborative computing session and also traffic on a communication channel other than the collaborative computing session), etc., as may be appreciated by those skilled in the art.

In particular, referring to the environment shown in FIG. 3, a number of processing facilities, including, for example, one or more of a web server 342, a log server 344, a ping server 346, a collaboration server 348, license manager 354, primary and secondary meeting managers 356, application servers (e.g. telephone agent 358, poll 360, chat 362, video 364, voice over IP 366, document view 368, application share 370, and file share 372) may be integrated with a number of data storage facilities, such as, for example, a web database 350 and a meeting database 352 to implement a system for collaborative meetings over the Internet (e.g., for collaborative computing session "process" 300). As depicted, the processing and database facilities of this environment ("process" 300) may be divided into a web zone and one or more meeting zones for interaction with one or more client browsers (which may operate on respective participant devices 200).

A web zone may comprise one or more server machines that share a common web database 350. In the web zone, web server 342 may have a unique IP address (which may be associated with a particular website) and may respond to, e.g., Hyper-Text Transport Protocol (HTTP) requests coming to that IP address from client browser 243. Web server 342 serves or supports web pages, while web database 350 may contain static information for the website including site specific data, web pages, and user data.

Illustratively, a meeting zone is a collection of servers and databases that help perform synchronous activity of an on-line collaborative meeting. In a meeting zone, the meeting managers 356 may be servers which communicate with other servers in the meeting zone (e.g., collaboration server 348, log server 344, ping server 346, etc.) to keep track of the on-line meetings in progress in the meeting zone. Meeting managers 356 may log meeting information into meeting database 352. Ping server 346 works with meeting managers 356 to determine a collaboration server 348 that is most suitable for hosting a particular meeting; it may act as a load balancer for the meeting service. Collaboration servers 348 may handle all real time control and communication during an on-line collaborative meeting. The application servers (e.g., servers 358 through 372) may support specific features that may be available as part of an on-line collaborative meeting, such as, for example, telephony, polling, chatting, video, voice over IP, document review, application sharing, and file sharing. Also, license manager 354 may keep track of and enforce licensing conditions and charges for the meeting. Further, the log server 344 may keep track of meeting logs, and meeting database 352 may maintain at least a portion of the transient data required to conduct and keep track of on-line meetings. This data may include, for example, site and user information that would be required to establish and conduct a meeting.

Figure 4:
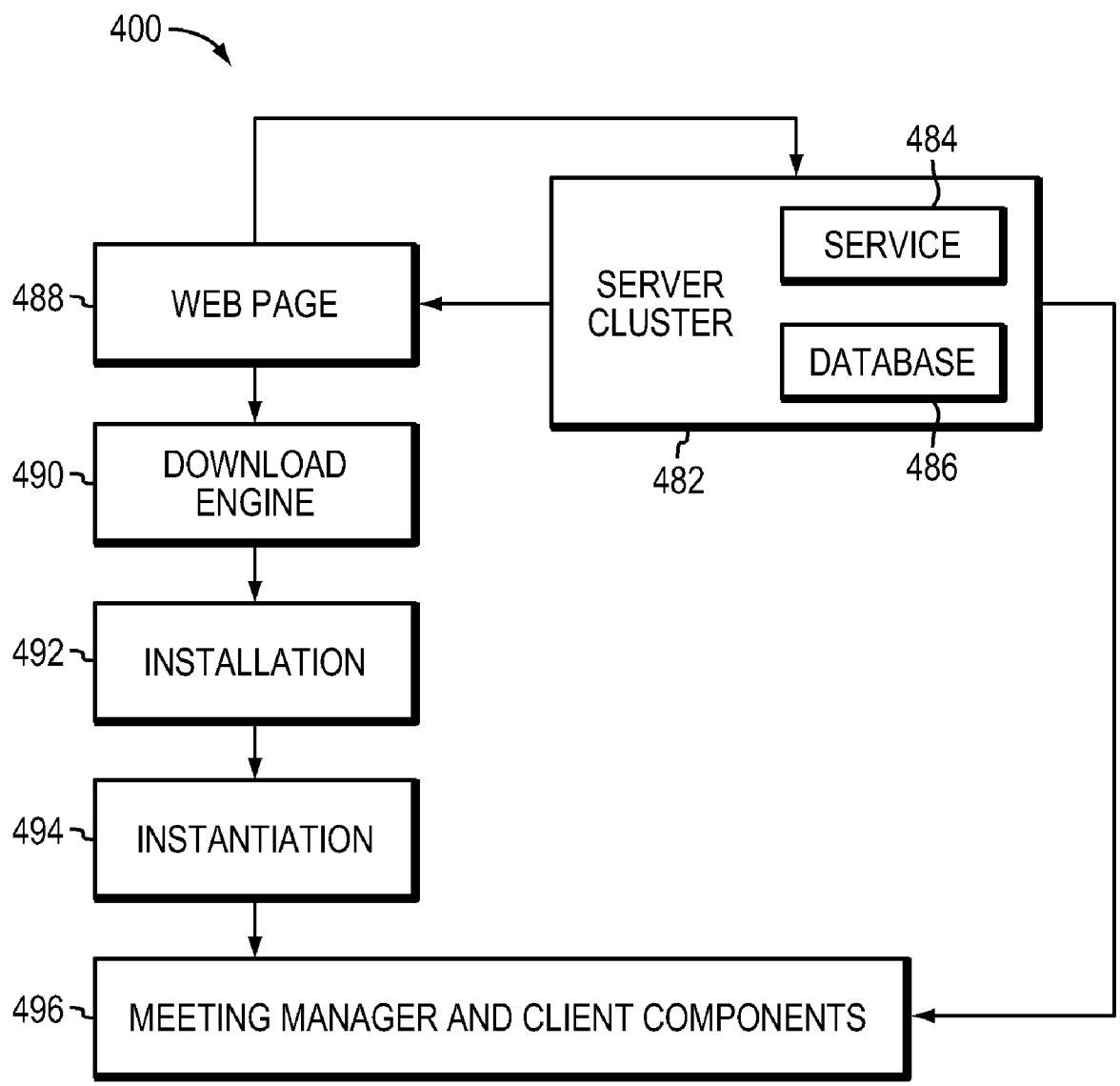
FIG. 4 illustrates an example session initiation process.

FIG. 4 is a block diagram for an example session initiation process 400, according to one or more embodiments described herein. For example, session initiation process 400 may occur in a participant device 200, which interacts with an interaction server 300 in a client-server architecture. Illustratively, interaction server 300 is represented as a server cluster 482, which can comprise one or more server computers for supporting an activity (e.g., an on-line meeting). Some of these computers can be web servers, database servers, and/or service management servers and may be configured in one or more cluster arrangements as described above.

The session initiation process 400 may occur over several client phases for the supported activity. For instance, a web page phase 488 (e.g., of a "join meeting" web page) may be responsible for user login, profile maintenance, scheduling, and starting or joining the activity (e.g., on-line interactive meeting). In the web page phase 488, the participant/user may begin the activity, for example, using a web browser window on the respective participant device 200. The browser window may implement a graphical user interface (GUI) and may be used to access a website supported by server cluster 482, at which the activity can be hosted or supported. Further, in the web page phase 488, for login and authentication the participant device 200 interfaces with servers in server cluster 482. In one embodiment, after a host user submits appropriate meeting information on a suitable web page, the meeting data/parameters are stored in a database server within server cluster 482. This data may then be passed to the service management servers within the cluster 482. For participants who attempt to join this meeting, authentication is established based on the meeting parameters set by the host.

After passwords are verified for a participant, the participant may then be routed to a download page for download engine phase 490, which may allow a participant to download an appropriate download engine component 247 (if not already installed on the participant device 200). In an installation phase 492, the activity manager 244, and other code modules 249 may be downloaded and installed from the server cluster 482 supporting the meeting website. As noted above, a minimal set of code modules may be downloaded and installed on the participant device 200 in the installation phase 492.

After the download and installation portions of the process are completed, the meeting parameters may be passed to the activity manager 244 from a "Meeting in progress" web page. An instantiation phase 494 provides a standard interface which may be called by the download engine component 247 after the download and installation phase 492 have completed. In the instantiation phase 494, the activity manager 244 and various other code modules 249 are instantiated (which may include launching or executing). (Note that an initialization (INI) file may be installed that contains all the necessary client parameters for instantiation.) There can be multiple versions for implementation of the instantiation phase 494, such as, for example, a plug-in version and a stand-alone version. For example, for a plug-in version, an embedded web browser program acts as the native application that invokes one or more plug-in components during instantiation phase 494, thus the session operates on the web browser program itself. Conversely, in a stand-alone version, executable code for the activity manager 244 operates outside of (separate from) the web browser process.

Once the parameters are received and the client connection to the server cluster 482 is established, the activity manager 244 and the initial set of code modules 249 may be executed to allow the participant/user to begin engaging in the activity (e.g., participating in the meeting) by supporting the basic functionality that is necessary for the activity (i.e., a collaborative computing session) during a meeting manager and client components phase 496. If the activity or meeting later requires more advanced functionality, the download engine component 247 may handle the downloading and launching of additional modules (e.g., DLL files) as needed. In the context of an interactive meeting, such functionality may be, for example, document and application sharing, file transfer, meeting playback, Internet telephony, etc.

Real-Time Event Notifications for Collaborative Computing Sessions

As noted above, one or more participants, e.g., hosts and/or attendees, may join a collaborative computing session from their participant devices through a "join meeting" web page. For example, a host (presenter) may schedule a meeting, and an invitation message (e.g., email) may be sent to the attendees with information regarding how to join the meeting (e.g., a link or hyperlink to the join meeting web page). An attendee may then join the meeting at the scheduled time by clicking on the join link in the invitation message, clicking on the join link in a calendar/scheduler process (e.g., Microsoft's Outlook®), or clicking on the join link in the meeting information page of a corresponding site.

Once the attendee has clicked on the join link, the "join meeting" web page may be displayed to the attendee where the attendee can enter required information to join the meeting. In the event the host has yet to join the session, however, and the associated meeting has yet to start, attendees may either be prevented from joining the session, or will join the session and wait for the host to join (a "join before host" feature). If unable to join, an attendee will be forced to continually return to the access point to refresh/update the status of the host and meeting, otherwise risking missing the meeting's start. Likewise, if an attendee has joined the session before the host, the attendee may still be forced to wait for the host to join and begin the meeting. In many situations, the attendee may desire to do something else after he/she learns that the meeting has not yet started, but typically will not want to miss the meeting when the meeting finally starts. (For example, the attendee typically is unaware of whether the meeting may have been cancelled, or if the host is delayed, etc.)

Currently, a notification may be sent to all participants of a session at a specified time, such as fifteen minutes before the scheduled start of the meeting. However, this notification is static and does not reflect the actual meeting status (e.g., if the host starts the meeting later than scheduled), and anyone not an original invitee to the meeting (e.g., for forwarded invitations) may not be known by the servers (e.g., interaction server 300/server cluster 482), and the new invitees will not receive the notification. Further, manually sent notifications (e.g., email, instant messaging, text messages, phone calls, etc.) may be sent from the host to the attendees to update the meeting's status, but this, too, suffers from various shortcomings, such as not being guaranteed (host may or may not send the notification), not reaching all participants (host may not send the notification to all interested attendees), etc.

According to embodiments described herein, therefore, a determination is made that a specified event of a collaborative computing session has occurred, such as a host of a web browser-based session joining the session, etc. In response to the specified event, a real-time electronic notification is transmitted to a particular set of one or more attendees of the session that the event has occurred, where the notification is illustratively transmitted via a communication channel other than the session (e.g., email, phone, etc.).

Illustratively, certain techniques described herein (e.g., the determination and the notification transmission) may be performed by interaction server 300 (server cluster 482), such as in accordance with a collaborative computing session process/service 300. In particular, these processes and/or services may be configured to operate in accordance with certain protocols/processes as described above, and in accordance with the techniques described herein. Further, other techniques may be performed by respective components of participant devices 200 as described herein, such as requesting notifications, joining sessions, and receiving notifications.

Operationally, events may be specified in a variety of different manners. For example, events may be preconfigured (default) events, or may be selected by the host and/or attendees. For instance, the host may set up a session/meeting with a certain selected event, or alternatively, any number of the attendees may select a particular event of which they wish to be notified (e.g., in an invitation or at a join meeting web page, each as described below). Also, the event may be configured based on the type of session or other parameters of the session (e.g., what type of meeting, the length of the meeting, the number of participants in the meeting, etc.).

According to one or more embodiments described herein, an event may be any definable and detectable occurrence in relation to a collaborative computing session. In particular, a participant may desire to learn of a particular (e.g., predefined) event to decide to join a meeting or for other purposes. For example, the specified event may illustratively be the host of the session joining the session, thus indicating a start of the session (e.g., as mentioned above, where the host may not have been on time). Other events may also be defined and specified, such as a particular attendee/participant of the session joining the session, a specified number of attendees/participants of the session joining the session, a certain time having elapsed after the start of a session, a particular meeting topic occurring during the session, etc. (For example, it may be determinable/detectable that a meeting presenter/host reaches a certain topic by a particular document or page/slide of a document being shared, or based on a key word search, etc.) These specified events are illustrative examples, and other detectable events related to the session may be specified in accordance with the one or more embodiments described herein.

Figure 5:
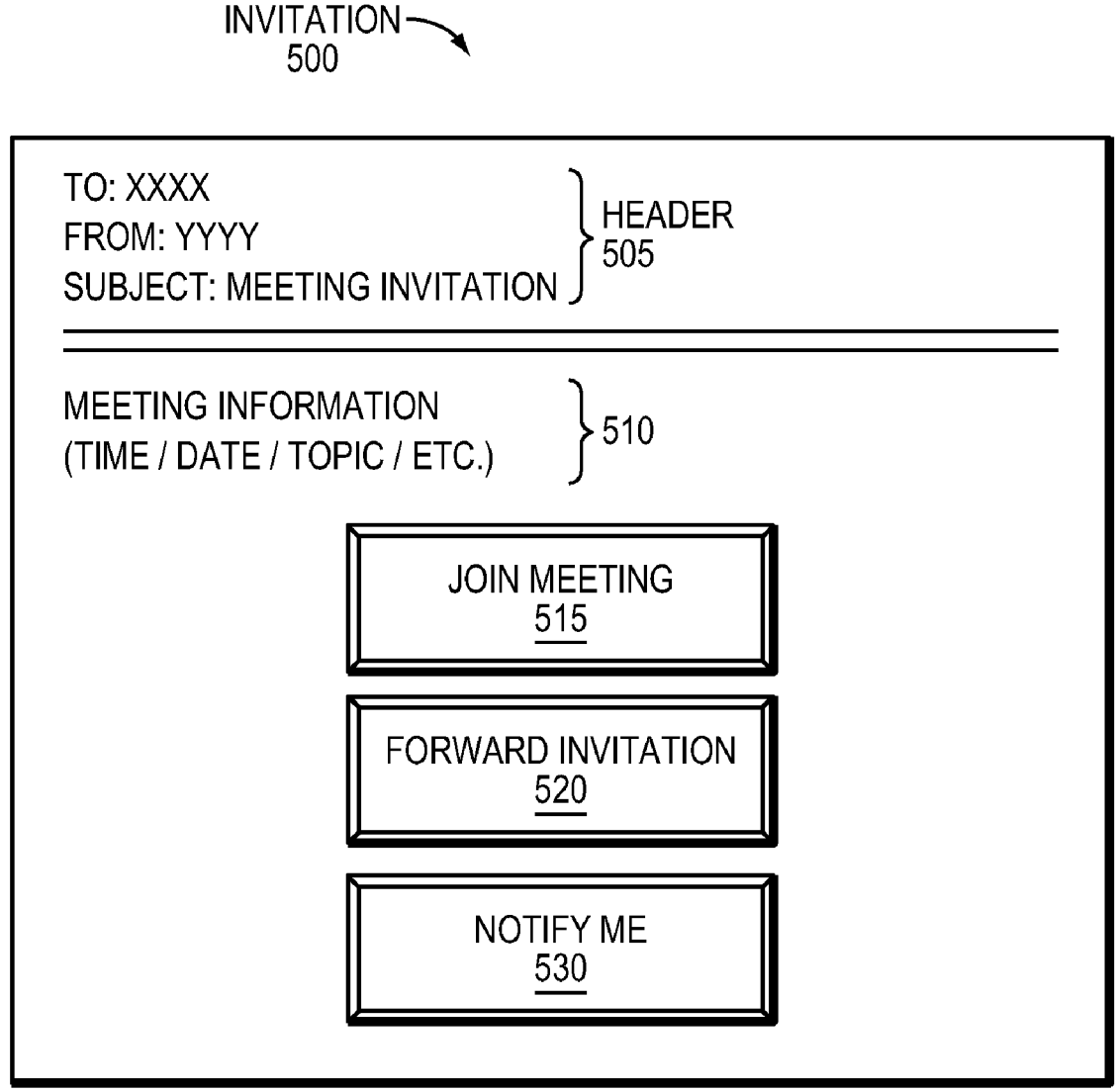
FIG. 5 illustrates an example invitation message.

As mentioned, attendees may be invited to join a session (meeting) in advance of the session through an electronic invitation communication, such as an email, text message, etc. FIG. 5 illustrates a simple invitation message 500 in accordance with one or more embodiments described herein. Illustratively, the simple invitation may comprise header information 505 (e.g., "To:", "From:", "Subject:", etc.) and a meeting information section 510, such as time, location, invitees, and other useful information regarding the session/meeting, as will be appreciated by those skilled in the art. Further, an option (e.g., button/link/etc.) may be present within the invitation 500 that allows a participant to attend or join the meeting ("join meeting" option 515), which may direct the participant to a "join meeting" web page or other access point through which a participant may join a session. Also, an option 520 to invite other attendees may also be present, such as by forwarding the invitation message 500 (along with its associated fields) or by directing the invitee to a web page associated with the session that allows for further invitees to be added and to receive respective invitation messages 500, accordingly.

In one or more embodiments, the message 500 may (though need not) comprise a selectable option 530 for an attendee (invitee) to request notification based on a certain event. In particular, a "notify me" option may link to a "notify me" web page associated with the session that allows the invitee to specify preferred notification methods and corresponding events. Alternatively, such as for default events based on the session itself or configured by the host, the "notify me" selectable option 530 may trigger a response (e.g., a reply email) to be sent to the interaction server 300 in order to maintain a database (e.g., meeting database 352) regarding attendees that have requested notification, as described herein.

Figure 6:
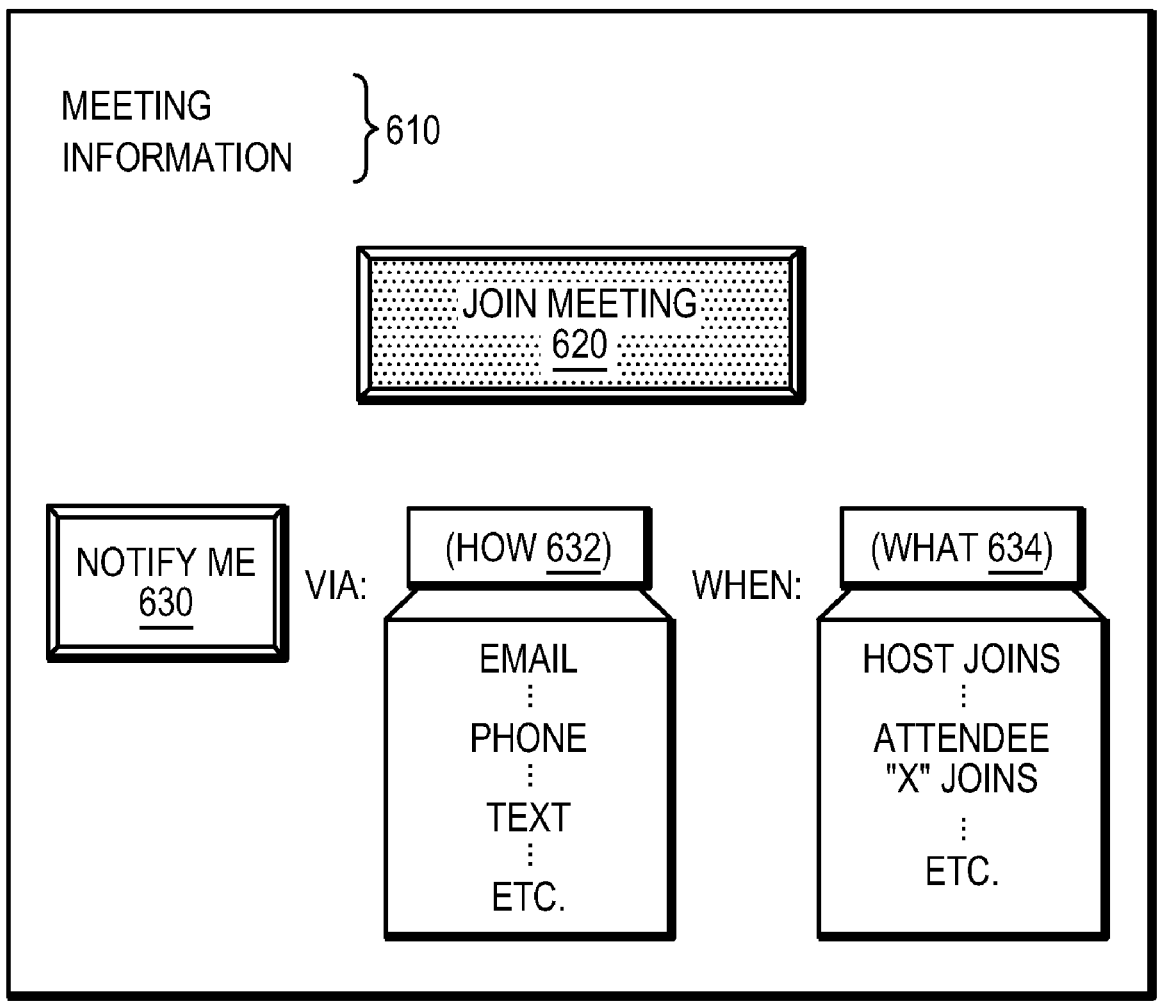
FIG. 6 illustrates an example join meeting web page.

FIG. 6 illustrates a simplified example web page 600, such as a "join meeting" web page or a "notify me" web page (as mentioned above), e.g., serviced by web server 342. For instance, meeting information section 610 may include any information regarding the session/meeting, such as time, location, invitees, and other useful information. For a "join meeting" web page, a "join meeting" option 620 may be present if the meeting has started or is about to start (e.g., within thirty minutes of the meeting starting). Selecting the join meeting option 620 may allow an attendee to enter various information, such as a username, password, etc. in order to join the meeting, as described above. Notably, as mentioned above, a meeting may prevent (or conversely, allow) attendees from joining the session in response to a host of the session having not joined the session (e.g., a "join before host" meeting option). If unable to join before the host, attendees may be shown an inactive (e.g., "grayed out") join meeting option 620 (as shown), or the option may not be present. Also, for "notify me" web pages, the join meeting option 620 may either be inactive or not present. (Notably, the "join meeting" and "notify me" web pages may be the same page, and need not be differentiated. One possible difference is merely the inclusion or exclusion of "join meeting" option 620, as mentioned.) In either case, or specifically in response to the "join meeting" option 620 being inactive or not present, a "notify me" option 630 may be available for selection by session participants.

The "notify me" option (e.g., button) 630 may direct a participant to an additional web page, or, illustratively, comprises fields (e.g., drop down menus/lists, fill-in forms, etc.) for a participant to indicate a manner in which the participant wishes to be notified (e.g., "how" field 632), and one or more events of which the participant wishes to be notified (e.g., a "what" field 634). This option 630 thus allows the attendees to define a notification mechanism, where the attendee may request inclusion within a particular set of attendees to receive a notification in response to a specified event, as well as the communication channel via which each respective notification is to be transmitted. In this manner, in particular, the defined notification mechanism allows an attendee to change and add any notification methods other than those selected by the host (e.g., other than the email address used for the invitation). Further, attendees who have received a forwarded invitation message 500 (or who are otherwise informed of the meeting and its associated "join meeting" web page 600) may also request that they receive notification in response to a specified event.

According to one or more embodiments described herein, interaction server 300 (e.g., the collection of collaborative computing servers) monitors the collaborative computing session (e.g., before and/or after the start of the session/meeting) to determine when a specified event of the session has occurred. For example, log server 344 may keep track of events occurring in relation to the session, which may be compared against a database (e.g., 352) which maintains a list/table mapping specified events to a set of corresponding attendees/participants, along with their preferred communication channel. FIG. 7 illustrates an example list/table 700 for maintaining event/notification mappings, which may be illustratively maintained by interaction server 300. For instance, list/table 700 may comprise a plurality of entries 750 populating fields to map an event 705 to a set of participants 710 that have signed up for (selected) notification of the event, as well as their corresponding communication channel(s) 715. As shown, for example, participants A, B, C, and D have requested notification when the host has joined the session, and each has specified either an email address, a phone number for a voice message, or a phone number for a text message. Also, a participant E has requested an email notification when participant D has joined the session. (Note that certain configured events/notifications, e.g., defaults, list/table 700 may comprise one or more policies/rules by which the server 300 may determine appropriate action, such as "in response to host joining, send emails to any participant not yet joined at their known invitational email addresses.") Illustratively, the particular set of attendees may comprise all attendees, all attendees based on a certain rule/policy (e.g., yet to have joined the meeting), or, more particularly, each attendee specifying the same event in a request for notification.

In response to detecting a specified event (e.g., in field 705), a real-time electronic notification that the event has occurred is transmitted (e.g., by server 300 based on field 720) to a particular set of one or more attendees of the session (e.g., based on fields 710 and 715), specifically where the notification is transmitted via a communication channel other than the session. For example, where an illustrative collaborative computing session utilizes a web browser application (e.g., for web conferencing or online meetings), the communication channel of the notification may be via a phone, pager, fax, text messages, short message service (SMS), email, instant messaging (IM), etc. In this manner, a session participant may be informed of the event without having to monitor the session, such as leaving a participant device 200 and being notified on a peripheral device 120 (e.g., a phone, pager, etc.). At the same time, however, the participant device 200 may still receive the notification (e.g., an email to a PC), so long as the notification does not utilize the session itself (e.g., does not appear through the web browser application used for the session, for example, the web conference).

Notably, the notification may be transmitted via a plurality of communication channels other than the session, such as where participants request different communication channels, or where one or more participants elect to be notified over multiple channels (e.g., for redundancy). Also, as shown in list/table 700, a plurality of events may be specified, and thus a separate notification may be transmitted in response to occurrence of (i.e., detection/determination of) each specified event, accordingly.

As an illustrative example, an attendee may attempt to join a meeting at the scheduled time, only to find out that the host has not yet joined the meeting (e.g., the "join meeting" option 620 is inactive). Rather than waiting and refreshing the "join meeting" web page 600, the attendee may select the "notify me" option 630, and may request that a notification be sent to his cellular phone via a text message once the host has joined the meeting. While the attendee attends to other matters, the host may join the meeting later than scheduled (e.g., fifteen minutes), and a notification (e.g., text message) is sent to the attendee's cellular phone that the meeting has started, and the attendee may again attempt to join the meeting in response. (Further, as an example default-configured event, in response to the host joining/starting the session, a particular set of invited attendees that have not yet joined the session may be determined, whether or not they requested notification, and a notification may be transmitted to those attendees to inform them that they are late to the meeting.)

Figure 8:
FIG. 8 illustrates an example event notification.

Briefly, FIG. 8 illustrates a simplified example of a notification message 800 in accordance with one or more embodiments described herein. Illustratively, the message 800 is shown in a visual format, such as for emails, text messages, etc., however the same "fields" may be applicable in an audible format, such as portions of a voice recording in a phone message, etc. In particular, the session information field 810 may comprise basic information about the session, while the event notification message 815 itself may comprise, for example, a message set by the host, a default message, a message determined based on the event/session, a message selected/configured by the participant when the notification was requested, etc. Notably, notification 800 may also comprise a selectable option for an attendee to join the session (option 820). For instance, option 820 may function in a manner similar to the "join meeting" option 515 of invitation 500. For example, if the notification is embodied as a phone message, then an automatic callback may be implemented for the attendee to join meeting easily. Alternatively, if the notification is an email message, then the link may be a clickable link/hyperlink to the "join meeting" web page 600 or other means of accessing the meeting.

In addition, notification message 800 may be embodied as a "pop-up" window, as may be appreciated by those skilled in the art. For example, while an attendee awaits a particular configured event (e.g., waits for a host to join a meeting), the attendee may utilize other programs on the attendee device, such as Internet browsing, word processing, etc. Once the event occurs, then, the interaction server may instruct (e.g., via a remote procedure call) collaboration software on the attendee's device to open a message/text box (a pop-up window or display) on the attendee's display, indicating that the event has occurred in a similar manner to notification message 800 shown above or otherwise.

Figure 9:
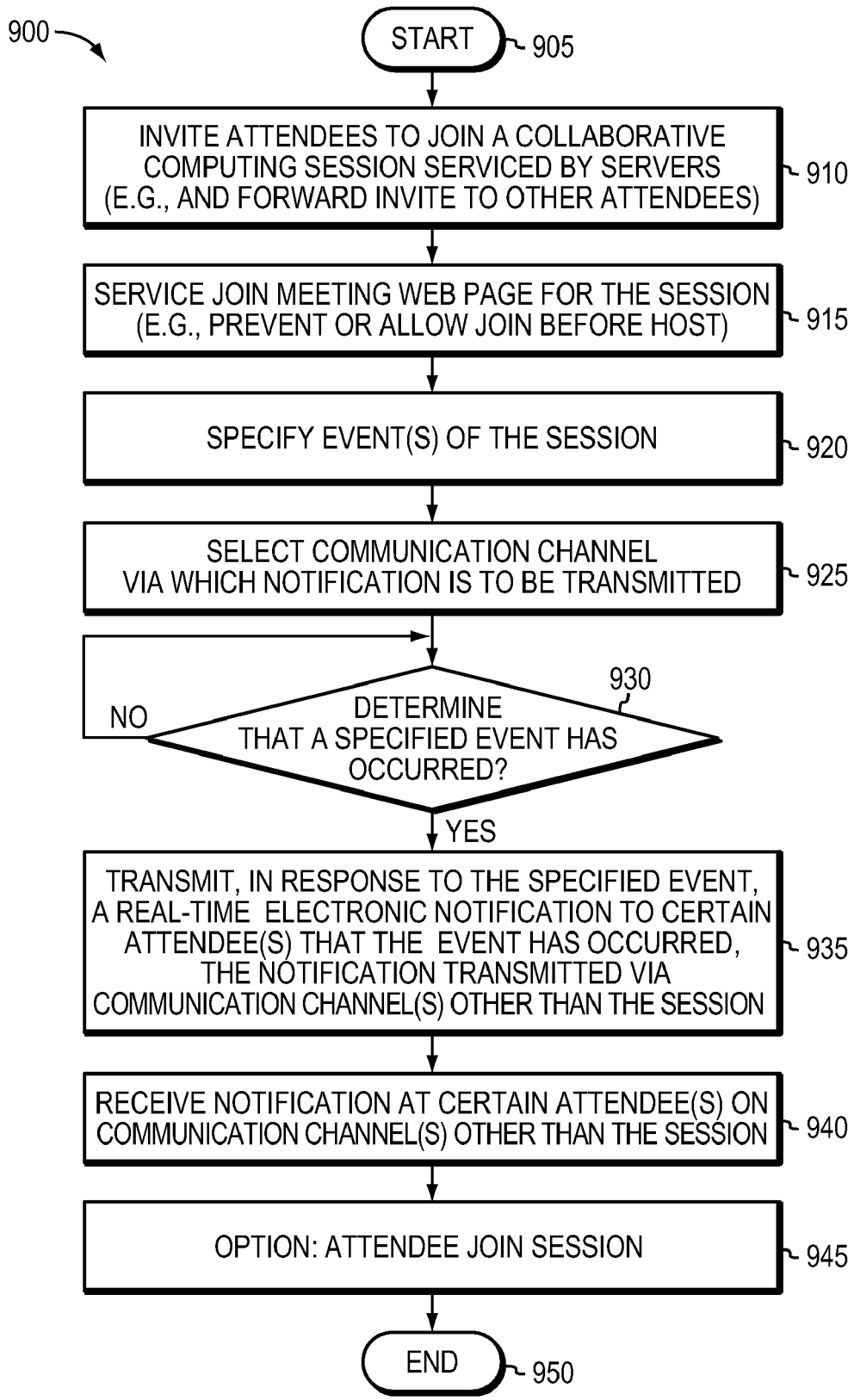
FIG. 9 illustrates an example procedure for real-time event notifications in collaborative computing sessions.

FIG. 9 illustrates an example procedure for real-time event notifications in collaborative computing sessions in accordance with one or more embodiments described herein. The procedure 900 starts at step 905, and continues to step 910, where attendees are invited (such as through an invitation message 500) to join a collaborative computing session that is serviced by servers 300 (482). (Note that other attendees may be invited through forwarded invitations, as mentioned above.) The server 300 also services the join meeting web page for the session in step 915, for example, by preventing or allowing attendees to join before host.

Either through the invitation message 500, or at the join meeting web page 600, (or, as the host, in a web page to establish/configure the meeting), one or more events of the session may be specified in step 920 for which notification is to be transmitted to one or more participants (e.g., attendees) over a communication channel selected in step 925. For example, as mentioned above, the event and notification may comprise emailing attendees yet to join the session in response to the host's joining the session. Conversely, an attendee may specifically request (if so allowed) to be notified when a certain other attendee has joined, etc.

Once it has been determined (e.g., by interaction server/ collaborative computing process 300) that a particular specified event has occurred in step 930, then in response, the process 300 may transmit a real-time electronic notification 800 that the event has occurred to certain attendees/participants (i.e., those configured or requesting notification in response to the detected event), receiving the notification in step 940. Again, this notification is transmitted via one or more communication channels other than those within the session. For example, if the illustrative session is a web-based on-line meeting, then the communication may be through an email, text message, phone call, etc., that is specifically not via the web-based on-line meeting. Optionally, as mentioned above, in step 945 the attendee may join the session in response to receiving the notification (e.g., through the selectable option 820 within the notification 800). The procedure 900 ends in step 950, notably with the ability to continue monitoring for other specified events in step 930 (such as for events other than a host joining the session, which generally occurs only once per session) and transmitting notifications accordingly.

Advantageously, the novel techniques described herein provide for real-time event notification in collaborative computing sessions in a computer network. By transmitting event notifications over communication channels other than those within the session in which the event occurred, the novel techniques may improve user experience of collaborative computing sessions. In particular, the techniques described above may be used for effective (e.g., real-time) meeting notifications that reflect the state of a collaboration session (e.g., an online meeting), thus saving attendees valuable time as they need not wait for a session to start, or may be notified when other desired events occur so as to only join the session at a desired time.

While there have been shown and described illustrative embodiments that provide for real-time event notification in collaborative computing sessions in a computer network, it is to be understood that various other adaptations and modifications may be made within the spirit and scope of the present invention. For example, the embodiments have been shown and described herein for use with web browser-based applications, such as online conference meeting sites. However, the embodiments of the invention in their broader sense are not so limited, and may, in fact, be used with other applications/sessions, such as "chat rooms," phone conferences (e.g., where the communication channel on which the notification is sent is other than over the phone, such as an email indication that the phone conference has begun, etc.), or other personally collaborative session, as may be appreciated by those skilled in the art. For instance, a telepresence session may be established between two or more remote locations (as understood by those skilled in the art), and a notification may be sent to a particular set of attendees (e.g., at one location) when a person is detected entering the session (e.g., at another location), such as by motion sensors, video detection techniques, etc. Also, while the notifications have been transmitted dynamically in response to a specified event, the particular set of attendees to receive a notification may also be used to transmit other notifications, such as manual messages from the host (e.g., indicating a meeting status to only those that requested status, such as "the host will be fifteen minutes late", etc.).

As noted above, the embodiments described herein apply to a number of participants interacting in an on-line, interactive, or collaborative setting, such as for a meeting, training or education, support, or any other event that may require a number of participants to work together, interact, collaborate, or otherwise participate, such as web conferences, on-line meetings, etc. Thus, as used herein, the phrase "collaborative computing session" is used to describe these settings/events, particularly where a number of participant computers/devices collaborate in an established session, as may be appreciated by those skilled in the art. Specifically, a collaborative computing session as used herein is distinguished from groups of computers "collaborating" for computational (e.g., processing or memory) or computerized measuring and/or monitoring purposes, such as those for use with tracking stock markets, measuring parameters (e.g., field instruments), network devices (e.g., routers, switches, storage devices, etc.), or other types of devices and associated "sessions." That is, a collaborative computing session as used herein defines a session among participant devices 200 and an interaction server 300 for use with sharing/distributing video and/or audio for presentations, meetings, or other personally collaborative events.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium (e.g., disks/CDs/etc.) having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
   determining that a specified event, which occurs during an ongoing collaborative computing session conducted between nodes in a network over an in-band communication channel, has occurred, wherein at least one of the nodes is a presenter node that shares content over the in-band communication channel, at least one of the nodes is associated with an attendee and receives and displays the content, wherein the specified event is defined by the attendee and the presenter node determines that the specified event has occurred;
   determining, by the presenter node, that each attendee of a particular set of one or more attendees has selected an out-of-band communication channel via which a notification is to be sent; and
   transmitting, in response to the specified event and while the collaborative computing session is ongoing, a real-time electronic notification from the presenter node to each attendee of the particular set of one or more attendees of the session that the event has occurred, the notification transmitted to each attendee via the out-of-band communication channel selected by the respective attendee.

2. The method as in claim 1, further comprising:
   specifying the event as a host of the session joining the session.

3. The method as in claim 1, further comprising:
   specifying the event as a particular attendee of the session joining the session.

4. The method as in claim 1, further comprising:
   specifying the event as a specified number of attendees of the session joining the session.

5. The method as in claim 1, further comprising:
   specifying the event as a particular meeting topic occurring during the session.

6. The method as in claim 1, further comprising:
   each attendee of the particular set of one or more attendees specifying the same event.

7. The method as in claim 1, further comprising:
   specifying a plurality of events; and
   transmitting a notification in response to occurrence of each specified event.

8. The method as in claim 1, further comprising:
   transmitting the notification via a plurality of out-of-band communication channels.

9. The method as in claim 1, wherein the collaborative computing session utilizes a web browser application as the in-band communication channel, and wherein the out-of-band communication channel is selected from a group consisting of:
   short message service (SMS), email, instant messaging (IM), and pop-up message.

10. The method as in claim 1, further comprising:
    inviting attendees to join the session in advance of the session through an electronic invitation communication.

11. The method as in claim 10, further comprising:
    specifying the event as a host of the session joining the session;
    determining, in response to the host joining the session, the particular set of one or more attendees as invited attendees that have not joined the session before the host joined the session; and
    transmitting the notification to the particular set of invited attendees of the session that have not joined the session before the host joined the session.

12. The method as in claim 11, further comprising:
    including within the electronic invitation communication a selectable option for an attendee to request inclusion within the particular set of one or more attendees and to receive the real-time electronic notification in response to the specified event.

13. The method as in claim 12, further comprising:
    forwarding the electronic invitation communication from a first attendee to a second attendee, wherein the forwarded electronic invitation communication includes the selectable option for the second attendee to request inclusion within the particular set of one or more attendees and to receive the real-time electronic notification in response to the specified event.

14. The method as in claim 1, further comprising:
    including within the real-time electronic notification a selectable option for an attendee to join the session.

15. The method as in claim 1, further comprising:
    servicing the collaborative computing session by one or more collaborative computing servers.

16. The method as in claim 1, wherein attendees join the collaborative computing session from a join meeting web page serviced by one or more collaborative computing servers, the method further comprising:
    responsive to a host of the collaborative computing session having not joined the session:
    preventing attendees from joining the session; and
    allowing attendees to request inclusion within the particular set of one or more attendees and to receive the notification in response to the host joining the session.

17. The method as in claim 1, wherein attendees join the collaborative computing session from a join meeting web page serviced by one or more collaborative computing servers, the method further comprising:

responsive to a host of the session having not joined the session:
allowing attendees to join the session; and
allowing attendees to request inclusion within the particular set of one or more attendees and to receive the notification in response to the host joining the session.

18. The method as in claim 1, further comprising:
servicing a join meeting web page by one or more collaborative computing servers through which attendees join the collaborative computing session; and
including within the join meeting web page a selectable option for an attendee to request inclusion within the particular set of one or more attendees and to receive a notification in response to the specified event.

19. An apparatus comprising a presenter node, the presenter node comprising:
one or more network interfaces adapted to communicate first traffic for a collaborative computing session on an in-band communication channel to one or more attendees and second traffic on an out-of-band communication channel, separate from the in-band communication channel used by the collaborative computing session to a particular set of one or more attendees;
a processor coupled to the network interfaces and adapted to execute one or more processes; and
a memory adapted to store a collaborative computing server process executable by the processor, the server process when executed operable to:
determine by the presenter node that a specified event has occurred while the collaborative computing session is ongoing, wherein the specified event is defined by the one or more attendees;
determine by the presenter node the out-of-band communication channel for each attendee of the particular set of one or more attendees, via which a notification should be transmitted; and
transmit by the presenter node, in response to the specified event, a real-time electronic notification to each attendee of the particular set of one or more attendees of the session that the event has occurred, the notification transmitted to each attendee of the particular set of one or more attendees via second traffic on the out-of-band communication channel, determined for the respective attendee.

20. The apparatus as in claim 19, wherein the specified event is a host of the session joining the session.

21. The apparatus as in claim 19, wherein the specified event is a particular meeting topic occurring during the session.

22. The apparatus as in claim 19, wherein the out-of-band communication channel is selected from the group consisting of: short message service (SMS), email, instant messaging (IM), and pop-up message.

23. Software encoded in one or more non-transitory computer-readable media of a presenter node and when executed operable to:
determine that a specified event, which occurs during an ongoing collaborative computing session conducted between the presenter node and one or more nodes in a network over an in-band communication channel, has occurred, wherein the presenter node shares content over the in-band communication channel and at least one of the one or more nodes is associated with an attendee and receives and displays the content, and wherein the specified event is defined by the attendee;
determining for each of a particular set of one or more attendees of the collaborative computing session, an out-of-band communication channel, that was selected by the respective attendee, via which a notification is to be transmitted; and
transmit, in response to the specified event, a real-time electronic notification to each attendee of the particular set of one or more attendees of the session that the event has occurred, the notification transmitted to each attendee via the out-of-band communication channel selected by the respective attendee.

* * * * *